UNITED STATES PATENT OFFICE.

NATHAN SULZBERGER, OF NEW YORK, N. Y.

METAL COMPOUND AND PROCESS OF PRODUCING THE SAME.

14,656. Specification of Reissued Letters Patent. Reissued May 27, 1919.

No Drawing. Original No. 1,164,141, dated December 14, 1915, Serial No. 876,494, filed December 10, 1914. Application for reissue filed December 12, 1917. Serial No. 206,839.

*To all whom it may concern:*

Be it known that I, NATHAN SULZBERGER, a citizen of the United States, residing in New York, county of New York, and State of New York, have invented certain new and useful Improvements in Metal Compounds and Processes of Producing the Same; and I do hereby declare the following to be a full, clear, and exact description of the invention, such as will enable others skilled in the art to which it appertains to make and use the same.

It is well known that metallic nickel obtained by reducing nickel oxid or similar reducible nickel compounds at relatively high temperatures in hydrogen, can be used for effecting catalytic reactions, particularly reactions of reduction. Metallic nickel produced in this way, at temperatures which make the product catalytically active, is a strongly pyrophoric product, that is to say, it becomes incandescent spontaneously when exposed to the air at ordinary temperatures immediately after reduction. In order to overcome such pyrophoric properties, special precautions are necessary in handling the reduced nickel or in treating it to neutralize or overcome its pyrophoric properties.

The present invention relates to catalysts which are produced in a wet way, as distinguished from catalysts produced by reduction with hydrogen at high temperatures, and which, as produced, are non-pyrophoric; as well as to the non-pyrophoric catalysts themselves.

Hydrazin in particular, as well as other compounds of nitrogen containing hydrogen (as for instance hydroxylamin) and possessing reducing properties, can not in certain cases be used as reducing agents. I have found, that, in many of these instances, however, the reducing properties of hydrazin, etc., can be increased or made to exert themselves, if certain metal compounds, even in very small amounts, are added. As such metals I have found those belonging to the platinum group especially valuable, which group, as is well known, includes the metals: osmium, iridium, platinum, ruthenium, rhodium and palladium. Other metals and their salts may also be employed, as, for instance: sulfate of copper, chlorid of gold, etc.

In the following I give, as an example of my novel process, the reduction of nickel-borate by means of hydrazin-hydrate, it being, however, distinctly understood, that I wish in no wise to limit myself to the given quantities or to the working method specifically stated and here employed.

Nickel-borate, representing a greenish powder insoluble in water, does not, even when heated in water containing hydrazin-hydrate undergo any visible change. Thus even when its suspension is boiled there seems to be no evolution of gas, due to the decomposition of the hydrazin. This fact by itself shows that the reducing qualities of the hydrazin are not exerted. If, however, to the suspension of the nickel-borate in water a very small amount (oftentimes even only a trace) of, for example, a solution containing palladium-ammonium-protochlorid is added, and then the liquid containing hydrazin (or a salt of hydrazin, as, for instance, sulfate of hydrazin and an alkali), the evolution of hydrogen-gas soon becomes visible. This evolution of gas becomes very violent, particularly on heating, while the nickel-borate changes its color, darkening and finally precipitates practically all its nickel-content in consequence of the reducing action of the hydrazin, which action has been "incited" by the addition of the palladium-metal.

In one instance to a suspension of two grams of nickel-borate in about ten cc. of water, containing a few cc. of a solution of one part of palladium-ammonium-protochlorid in about 1000 parts of water, were added four grams of hydrazin-sulfate, which had been made alkaline by the addition of caustic soda. On heating a very violent evolution of gas was observed, while the suspended borate of nickel darkened in color. After ten to fifteen minutes the nickel metal had deposited itself as a black, voluminous, spongy mass, while the liquid above the same, had become water-like clear. This nickel possesses very marked magnetic properties and is particularly valuable also in hydrogenating fats in oils as, for instance, cottonseed oil. A sample of cottonseed oil, which was hardened with the above nickel-metal, proved to be particularly white in color, and the nickel (the "catalyzer") had settled out of the oil at the end of the hydrogenization in the bottom of the test tube so well, that the hot oil stood over the catalyzer as a clear liquid. During the process, however, the oil was black, due to the very minute and fine suspension of the nickel in the same. The presence of the small amounts of that most efficient catalyzer palladium makes this nickel especially valuable for such a catalytic process. Similarly, also, other salts of nickel, cobalt, etc., may be reduced by the action of a liquid containing hydrazin with the addition of an "inciting" metal (or a mixture of such metals) among which may be such salts, as, for instance, nickel nitrate, which are soluble in water, as well as such, as for instance, nickel-silicate (nickel-carbonate, cobalt-carbonate, etc.,) which, being insoluble in water, are only suspended in the same. Even nitrate of nickel, which, although easily soluble in water, can not be reduced by a solution containing hydrazin, even when heated with the same, can readily be reduced, if the hydrazin is used in connection with a metal, which "incites" its action, as, for instance, platinum-chlorid.

The above described working methods can variously be modified without leaving the scope of this invention. Thus the borate of nickel can also be reduced if the hydrazin-hydrate, using as an "inciter" platinum-chlorid. The "inciting" metal-salt may also be added to the borate simultaneously with the hydrazin-containing liquid. I prefer in many cases to add the hydrazin to the liquid containing the compound, which is to be reduced, and the inciting metal.

The process may, also, be of special technical value in the metallurgical separation of nickel, etc., from other products. As basic compounts of nitrogen and hydrogen principally to be considered are hydrazin (hydrazin-hydrate, salts of hydrazin with an alkali) and hydroxylamin (salts plus alkali) and derivatives, the value as reducing agents of which is increased or started by the addition of metals.

Having thus described my invention what I claim is:

1. Process for reducing metal-compounds, which are practically unreducible with nitrogen-hydrogen-compounds possessing reducing-action alone, consisting in treating such metal-compounds with such nitrogen-hydrogen-compounds in the presence of a catalytically acting metal.

2. The process of reducing reducible metal-compounds which comprises treating the said compounds with basic nitrogen-hydrogen compounds possessing reducing action, in the presence of another catalytically acting metal.

3. The process of reducing reducible metal-compounds which comprises treating the said components with basic nitrogen-hydrogen compounds possessing reducing action, in the presence of a catalytically acting metal belonging to the platinum group.

4. The process of reducing reducible metal-compounds which comprises treating the said compounds with hydrazin, in the presence of a catalytically acting metal.

5. Process for reducing metal-compounds which practically can not be reduced with hydrazin alone, which comprises treating the said compounds with hydrazin in the presence of a catalytically acting metal belonging to the platinum group.

6. Process for reducing metal-compounds, which practically can not be reduced with hydrazin alone, which comprises treating the said compounds with hydrazin in the presence of palladium.

7. The process of reducing nickel-compounds which comprises treating the same with hydrazin in the presence of a catalytically acting metal.

8. The process of reducing nickel-compounds which comprises treating the said compounds with hydrazin, in the presence of palladium.

9. As a new product, a product of reduction in a wet way of a reducible compound of a catalytic metal, together with a metal of the platinum group, said product being a black non-pyrophoric magnetic powder immediately after reduction; substantially as described.

10. As a new product, a product of reduction with hydrazin in a wet way, and in the presence of a metal of the platinum group, of a reducible compound of another metal, said product being a black non-pyrophoric magnetic powder immediately after reduction and containing the metals in an intimate state of combination; substantially as described.

11. As a new product, catalytically active nickel produced in a wet way by the reduction of reducible nickel compound, said product being a black non-pyrophoric magnetic powder immediately after reduction, and being in admixture with an inciting agent; substantially as described.

12. As a new product, catalytically active nickel obtainable in a wet way by the reduction of a reducible nickel compound with hydrazin in the presence of a metal of the platinum group, said product being a black non-pyrophoric magnetic powder immediately after reduction and containing nickel and a metal of the platinum group in an intimate state of combination; substantially as described.

13. As a new product, catalytically active nickel obtainable in a wet way by the reduction of a reducible nickel compound with hydrazin in the presence of palladium, said product being a black non-pyrophoric magnetic powder immediately after reduction and containing nickel and platinum in an intimate state of combination; substantially as described.

14. A catalytically active product comprising coprecipitated nickel and a metal belonging to the platinum group, obtainable in a wet way by reduction of a reducible nickel compound with hydrazin in the presence of a metal of the platinum group, said product being a black, non-pyrophoric magnetic powder immediately after reduction; substantially as described.

15. As a new product a catalytically active metal produced in a wet way by reduction with hydrazin in the presence of a metal of the platinum group, said product containing the catalytically active metal and the metal of the platinum group in a most intimate state of association; substantially as described.

NATHAN SULZBERGER.